United States Patent [19]

Turbeville

[11] 4,234,420

[45] Nov. 18, 1980

[54] METHOD AND APPARATUS FOR POLLUTANT SPILL CONTROL

[76] Inventor: Joseph E. Turbeville, 4303 Jetton, Tampa, Fla. 33609

[21] Appl. No.: 35,681

[22] Filed: May 3, 1979

Related U.S. Application Data

[63] Continuation of Ser. No. 792,583, May 2, 1977, abandoned.

[51] Int. Cl.² .................. B01D 15/06; B03C 1/30
[52] U.S. Cl. .................. 210/671; 210/676; 210/223; 210/242 AS; 210/401; 210/695; 210/924; 209/39; 209/215
[58] Field of Search .............. 210/242, 30 A, 730 W, 210/83, 222, 223, 242 AS, 400, 401, 411, DIG. 25, DIG. 26; 209/8, 38–40, 214, 215, 219, 225, 232, 257

[56] References Cited

U.S. PATENT DOCUMENTS

| | | | |
|---|---|---|---|
| 531,183 | 12/1894 | Harris | 210/42 R |
| 1,317,557 | 9/1919 | Davis | 209/232 |
| 2,430,157 | 11/1947 | Byrd, Jr. | 210/1.5 |
| 2,717,080 | 9/1955 | Anderson | 210/1.5 |
| 2,778,500 | 1/1957 | Fuller | 210/51 |
| 2,876,903 | 3/1959 | Lee | 210/242 |
| 2,907,717 | 10/1959 | Hann | 252/325 |
| 2,954,122 | 9/1960 | Colburn | 209/8 |
| 3,136,720 | 6/1964 | Baermann | 210/222 |
| 3,221,884 | 12/1965 | Muller | 210/242 |
| 3,314,540 | 4/1967 | Lane | 210/77 |
| 3,314,545 | 4/1967 | Grabbe et al. | 210/242 |
| 3,349,918 | 10/1967 | Ike | 210/223 |
| 3,358,838 | 12/1967 | Kosar et al. | 210/179 |
| 3,494,132 | 2/1970 | Logan | 61/1 |
| 3,494,862 | 2/1970 | Horowitz | 210/40 |
| 3,503,214 | 3/1970 | Desty et al. | 61/1 |
| 3,503,512 | 3/1970 | Desty et al. | 210/242 |
| 3,508,652 | 4/1970 | Woolley | 210/76 |
| 3,534,858 | 10/1970 | Harrington | 210/242 |
| 3,534,859 | 10/1970 | Amero et al. | 210/242 |
| 3,577,879 | 5/1971 | Ducrocq | 61/1 |
| 3,578,171 | 5/1971 | Usher | 210/342 |
| 3,581,899 | 6/1971 | Hunter | 210/242 AS |
| 3,657,119 | 4/1972 | Turbeville | 210/36 |
| 3,717,573 | 2/1973 | Warren | 210/222 |
| 3,756,414 | 9/1973 | Crisafulli | 210/242 |
| 3,796,660 | 3/1974 | Kaiser | 210/21 |
| 3,803,033 | 4/1974 | Sutherland | 210/40 |
| 3,804,256 | 4/1974 | Marriott et al. | 210/222 |
| 3,806,449 | 4/1974 | Kaiser | 210/40 |
| 3,890,224 | 6/1975 | Weiss et al. | 210/30 |
| 3,923,651 | 12/1975 | Weiss et al. | 210/21 |
| 3,970,518 | 7/1976 | Giaever | 195/1.5 |
| 3,980,562 | 9/1976 | Nilsson | 210/222 |
| 4,061,569 | 12/1977 | Bennett et al. | 210/DIG. 26 |

FOREIGN PATENT DOCUMENTS 427665  10/1965  Switzerland .

OTHER PUBLICATIONS

Ferromagnetic Sorbents for Oil Spill Recovery & Control, Turbeville, vol. 7, #5, Envir. Science & Tech. 5/73.
Frisch et al., Plastic Foams, 1972, vol. I.
Lichstein, Demand Wettability, A New Method for Measuring Absorbency Characteristics of Fabrics, 1974.
Kirk–Othmer, Encyc. of Chem. Tech., vol. 9, pp. 848–849, 1966.
Encyc. of Polymer Sci. & Tech., vol. 3, pp. 86–93, 98, 100, 101 & 126.
Oxenham, Development of a Polyurethane Foam Marine Oil Recovery System, 1973 Conf. on Pres. of Oil Spills, Wash., D.C.
Turbeville, A Ferromagnetic Sorbent System for Oil Spill Recovery, Paper #OTC2693, 5/3/76.
Annual Book of ASTM Standards, Part 28, Designation 1564–1569, 1969.

*Primary Examiner*—Ferris H. Lander
*Attorney, Agent, or Firm*—Arthur G. Yeager

[57] ABSTRACT

Organic pollutant spills on aquatic bodies may be collected by a method comprising distributing a plurality of buoyant magnetically susceptible, oleophillic, hydrophobic, resilient sorbent particles on the surface of the pollutant, allowing the sorbent to attract and bind the pollutant, magnetically collecting the pollutant-bound sorbent particles, compressing the pollutant-bound sorbent particles to expel the pollutant to a pollutant sump, allowing the compressed sorbent particles to recover from compression, and redistributing the sorbent particles on the surface of the remaining pollutant. An apparatus for the practice of the pollutant collecting method may be fabricated as a surface going aquatic vessel comprising a buoyant, pollutant storage tank, a rotatable cylindrical drum mounted on the tank normal to the relative flow of the aquatic body, a plurality of magnetic bands mounted circularly about the drum in parallel spaced relation, means for rotating the drum, means for wiping the drum, means for compressing, a sorbent storage and distribution hopper, means for conveying communicating from said means for wiping through said means for compressing to said sorbent storage and distribution hopper, a pollutant sump beneath said means for compressing, pollutant conduit means communicating between said pollutant storage tank and said pollutant sump, and means for propelling said vehicle through said aquatic body. An alternative collection and recovery apparatus may comprise a magnetic rake having an elongated handle, a support cross-member mounted normal to the handle at the point intermediate the handle length and adjacent a first end of the handle, a plurality of elongated magnetic tynes mounted along the cross-member in parallel spaced relation and extending parallel to the handle, a reciprocating pressing member having a plurality of tyne-accepting holes therein spaced along the length thereof and adapted to reciprocatingly mount to said tynes and parallel to said support cross-member and to be reciprocable from a first position adjacent the cross-member to a second position remote to said cross-member, and means for reciprocating mounted to said handle and connected to said pressing member. A sorbent particle suitable for use in conjunction with the method and apparatus for pollutant spill control may be fabricated from a buoyant, resilient, oleophilic, hydrophobic, synthetic plastic substrate and a plurality of non-abrasive magnetically susceptible particles imbedded in, and substantially evenly distributed throughout, said substrate.

19 Claims, 7 Drawing Figures

METHOD AND APPARATUS FOR POLLUTANT SPILL CONTROL

This is a continuation of application Ser. No. 792,583, filed May 2, 1977, and now abandoned.

BACKGROUND OF THE INVENTION

This invention relates generally to a pollution control and recovery method and apparatus, and specifically relates to a control and recovery method and apparatus which is continuous in nature and which utilizes magnetic phenomena.

As is well known to those skilled in the art, oil spills resulting from offshore accidents of large oil containing vessels and from offshore drilling operations have resulted in literally billions of dollars of damages world wide. More important than the monetary value of the damages, however, is the damage done to marine and shoreline eco-systems by such hydrocarbon pollutants. Even assuming that the billions of dollars in clean-up costs are expended to remove the hydrocarbon pollutant, by which term is meant hydrocarbon liquids which are insoluble or sparingly soluble in water, the virtual impossibility of complete removal of pollutant results in residual levels of contamination which may continue to damage marine animal and vegetable life forms for periods of months and perhaps years.

Since by far the worst ecological damage which is caused by hydrocarbon pollutant spills is realized at the shoreline, the most often used post-spill operation is the isolation of the hydrocarbon pollutant from the shoreline. Various prior art devices have been devised to form an impenetrable barrier to the spread of the spill, and in some cases to completely surround the spill site, such that the hydrocarbon pollutant is restricted in its motion to a relatively small area. Such devices depend for their functionality on the physical characteristics of the hydrocarbon pollutant and the aquatic media upon which it is borne, i.e. the fact that the hydrocarbon pollutant is immiscible with water and that the pollutant has a density less than that of water. Among such prior art devices are those disclosed in U.S. Pat. Nos. 3,494,132 to Logan; 3,503,512 and 3,503,214 to Destry et al; and 3,577,879 to Ducrocq.

Irrespective of whether such barrier-type devices as those disclosed above are utilized, the removal of the pollutant spill from the surface of the aquatic media on which it is carried is the desired result. Once again the two physical characteristics of the two-componant media, i.e. immiscibility and density differences, are utilized by various "skimmer" devices for the collection of the organic pollutant. Among such prior art devices are those disclosed in U.S. Pat. Nos. 2,778,500 to Fuller; 2,876,903 to Lee; 3,221,884 to Mueller; 3,314,540 to Lane; 3,358,838 to Kosar et al; 3,508,652 to Woolley; 3,534,858 to Harrington; 3,534,859 to Amero et al; 3,578,171 to Usher; and 3,756,414 to Crisafulli. Several of the skimmer devices disclosed in these references utilize a buoyant oil sump having a weir type opening which is carried at approximately the level of the aquatic media such that the pollutant will flow over the weir and be contained in the sump. Other of the skimmer devices utilize rolls or inclined belts or plates which are rotated through the pollutant layer, thereby picking up a film of the pollutant which adheres to the rotating device, which film is subsequently wiped from the device in such a way as to be deposited in a pollutant sump. As an alternative to wiping, suction may be utilized, as for instance with surface borne rollers, to collect the floating pollutant.

U.S. Pat. No. 3,494,862 to Horowitz discloses that oil which has been spilled, as for instance in a machine shop or on water, may be removed therefrom by treating the oil with a porous polystyrene in which the oil subsequently becomes absorbed. The separation of the oil-polystyrene mass is accomplished by heating to a two phase liquid system and decantation. In addition to the foregoing, U.S. Pat. No. 2,907,717 to Hann discloses the fact that oil-water emulsions may be broken by treating the emulsions in a settling zone with an unsoluble polyethylene or polystyrene material which is impregnated with an emulsion breaking agent. By fabricating the material such that its specific gravity is intermediate that of the water and the oil, the emulsion may be broken into a two phase system having a barrier layer of the plastic material, impregnated with the emulsion breaking agent, residing therebetween. Finally, hydrocarbon pollutant spills have been collected by a method in which the spill is first isolated from the surrounding aquatic media by the use of buoyant devices, scattering a buoyant oil-bonding substance, such as peat or slag on the surface of the spill in order to bond the pollutant, and subsequently collecting the oil-substance mass by mechanical means.

Until relatively recently, the development of magnetic separation devices utilized for the separation of magnetic solids from non-magnetic media, has proceeded along a parallel, but unrelated, course. Exemplary of such magnetic separation devices are those disclosed in U.S. Pat. Nos., 531,183 to Harris; 1,317,557 to Davis; 2,430,157 to Byrd, Jr.; 2,717,080 to Anderson; 2,954,122 to Colburn; and 3,136,720 to Baerman. Each of the devices disclosed and claimed in the referenced patents utilizes a magnetic source, either naturally occurring or electrically generated, in order to attract magnetically susceptible particles from a mixture of both susceptible and non-susceptible particles so as to remove the magnetically susceptible particles from the mixture.

Swiss Pat. No. 477,665 to Leo Theiler, Horw discloses the collection and recovery of a hydrocarbon pollutant spill which combines the use of an oil bonding substance with magnetic collection means. In order to accomplish the collection phase, the Theiler patent discloses the mixing of an oil-bonding material with particles of iron, i.e. powder or chips, in order to form a buoyant granular substance. As with peat or slag, the granular substance is subsequently scattered over the surface of the hydrocarbon pollutant in order that the pollutant may become bonded thereto. After a time sufficient for a bonding interaction to take place between hydrocarbon and bonder, the resultant pollutant mass is subjected to a magnetic field generated either electrically or through use of permanent magnets in order to attract the mass through the magnetically susceptible iron particles. By so doing the mass may be attracted to the magnet thereby collecting not only the iron containing bonding material but also the bound hydrocarbon pollutant. The Theiler patent discloses that, while peat and/or slag may be used as the oil bonding material, charcoal, such as wood charcoal or the like, is preferred due to the fact that such charcoal preferentially absorbs hydrocarbon liquids rather than water. Thus the Theiler sorbent is disclosed as comprising a mixture of iron particles and charcoal which are bound together by any suitable adhesive in an amount sufficient to form a stable particle and to prevent the corrosion of the included iron, but insufficient to decrease the porosity of the activated carbon.

U.S. Pat. No. 3,657,119 to Turbeville discloses that a magnetically susceptible oil-bonding particle may be fabricated from an expandable low density plastic such as polystyrene which has been either impregnated or coated with a plurality of magnetically susceptible particles sufficient to allow the oil-bonding sorbent to be collected by magnetic collection means. Such magnetic collection means are disclosed in the reference as including a buoyant grid having a plurality of parallel spaced ferromagnetic bars which are adapted to collect and contain the oil-sorbent mass. As is disclosed in the Turbeville patent, the sorbent particles may comprise any low density expandable plastic bead which is buoyant and which is also water-resistant.

Following the issuance of the Turbeville patent referred to above, several patents issued each of which disclosed the use of magnetic separation techniques in combination with a magnetically susceptible substance. U.S. Pat. No. 3,803,033 to Sutherland discloses the use of an iron-carbon complex to absorb particulate organic contaminants from a fluid stream and to subsequently remove the complex-contaminant mass by the use of a magnetic filter. U.S. Pat. No. 3,970,518 to Giaever discloses the use of small magnetic particles coated with an antibody layer which antibody layer preferentially attracts specific viruses, bacteria or other cells from a solution containing multicellular, multibacterial or multivirus populations. U.S. Pat. Nos. 3,796,660 and 3,806,449 to kaiser each discloses the use of a "ferrofluid", which ferrofluid comprises a stable colloidal suspension of magnetic particles in a carrier hydrocarbon oil selected from the group consisting of C9-C21 aliphatic hydrocarbons and the saturated C7-C18 napthalenic hydrocarbons and mixtures thereof, for the separation of multiphase liquid-liquid mixtures such as emulsions. In addition to the foregoing, U.S. Pat. Nos. 3,890,224 and 3,923,651 to Weiss disclose a method of removing slicks of oil from aqueous media which comprises firstly treating the oil slick with sufficient fine particles or granules of ferromagnetic material, said granules characterised in that they preferentially absorb or adsorb oil from aqueous media and are buoyant upon the surface of the aqueous media even when associated with oil; and secondly removing the particles, together with associated oil, by magnetic means. The Weiss references disclose that particle sizes of from 500 to 5,000 microns overall diameter are best for such removal operations. The Weiss references further disclose that the ferromagnetic material used for the collection of the oil spill is preferably a synthetic ferromagnetic polymer which is wetable by the oil, and insoluable in both the oil phase and the aqueous phase. Ferromagnetic polymeric materials suitable for use in the invention include polystyrene and copolymers of styrene and polyester, and may include polyesters, methyl methacrylate polymers and copolymers e.g. with ethyleneglycol dimethacrylate, phenol formaldehyde resins, polyvinyl chloride, polyethylene, and polyamides. The ferromagnetic component to be included within the polymer structure is disclosed as being either a soft ferrite, a hard ferrite or material which exhibits reversible magnetism such as gamma-iron oxide, magnetite or chromium dioxide. The Weiss reference also discloses that the oil absorbed or collected onto the ferromagnetic particles or granules may be recovered or removed by physical or chemical means such as washing, pressing, distillation or solvent extraction. Examples included in the Weiss patents disclose the preparation of a co-polymeric styrene and a polyester (see examples 1, 2, 6–9) and of the use of such magnetically susceptible polymeric substrates in the treatment, collection and recovery of oil slicks on the surface of aqueous media (examples, 41 10, 11 and 12). Additional examples (24 and 25) included in the Weiss patent disclose the preparation of vasiculated magnetic polystyrene particles having different particle sizes and porosity and suitable for the removal of oil slicks from water. The results given in these samples indicate that oil pick up efficiency averages approximately 4.5 (weight of oil picked up/weight of particles used $\times$ 100).

In addition to patent references hereinabove cited, significant developmental work has taken place in the private sector directed to the development of suitable hydrocarbon pollutant absorbents for use in the cleaning of pollutant spills. *Development of a Polyurethane Foam Marine Oil Recovery System;* J. P. Oxinam, R. A. Cochran, B. P. Hemphill and J. P. Fraser; Shell Development Company, Conference Report; presented at the 1973 CONFERENCE ON THE PREVENTION AND CONTROL OF OIL SPILLS, WASHINGTON, D.C. The Oxinam et al. publication disclosed the development of a slab molded polyurethane which may be fabricated at the site of the pollutant spill, which sorbent is effective for the sorption of various hydrocarbon pollutants. Such a polyurethane absorbent, following fabrication on site, may be reduced to suitable sized individual particles and subsequently dispersed upon the surface of the pollutant spill. The sorbent, saturated with pollutant, may subsequently be collected by mechanical collection means.

J. E. Turbeville, in a paper entitled *Ferromagnetic Sorbents for Oil Spill Recovery and Control* (Environmental Science and Technology, Volume 7, No. 5, 1973, pgs. 433–438) discloses that magnetically susceptible sorbents used in the collection and recovery hydrocarbon pollutants may be collected by a recovery unit including a rotatable drum encircled by a plurality of bands of magnetic material, a wiper blade and a particle-pollutant storage sump. The Turbeville article discloses that magnetically susceptible sorbent particles may be dispersed upon the surface of the pollutant spill, and allowed to form a pollutant-particle mass which tends to retain its integrity on the surface of the aquatic medium. By rotating the drum in the direction of movement of the mass, the particle-pollutant mass will be carried to a point with the magnetic lines of flux of the rotating drum, magnetically bound to the drum and carried thereby out of the water and into contact with the wiping device which is located adjacent the drum surface, which wiping surface removes substantially all of the magnetically bound mass from the drum surface and allows the mass to be collected in the particle-pollutant sump.

Despite the substantial amount of activity directed toward the development of the practical system for the magnetic collection of hydrocarbon pollutant spills, no system appears to have been developed which has enjoyed significant commercial success. Such lack of success in developing a commercially attractive system may be traced to the fact that no presently appearing system appears capable of allowing the efficient handling of the sorbent particles following the hydrocarbon liquid sorbtion and the fact that presently available systems do not appear to efficiently allow the sorbent particles to be recycled in a multi-cycle operation such that a limited amount of sorbent may be continuously recycled to collect and recover a significant amount of hydrocarbon pollutant prior to disposal.

This lack of re-cyclable sorbent appears to be the result of the lack of recognition by those skilled in the art that a non-destructive method of separating the sorbed pollutant from the sorbent is dependent on the utilization of sorbent components which may be freed of pollutant in such a way as to retain the sorptive abilities of the sorbent while refraining from causing detrimental chemical or physical change to the sorbent structure.

It is, of course, immediately apparent that the burning of the pollutant-sorbent mass is suggested by Theiler will not allow sorbent reuse. It is less apparent, by nonetheless true, that the spraying of the pollutant-sorbent mass with chemical agents, such as detergents and the like, as suggested by some of the aforementioned patent references, would introduce water-soluble pollutants into any aquatic medium in which such a "treated" sorbent was introduced for reuse. Thus, if destruction and chemical treatment of the pollutant-sorbent mass are eliminated from consideration as means for the regeneration of a recyclable sorbent, the only immediately apparent remaining alternative is physical separation.

Counted among the available physical methods of separation are filteration, centrifugation, wringing, etc. While each of these methods may accomplish the desired removal of pollutant, filtration and centrifugation are ultimately impractical as each requires equipment of such sophistication and expense that the regenerative process may even be less cost effective than simple destruction. At the same time, the wringing of sorbent particles, while attractive from the economic and efficiency aspects has heretofore been found to be of little utility outside the laboratory due to the fact that the sorbent structure has been found to deteriorate and decompose after a limited number of sorption-wringing cycles.

It is therefore an object of this invention to provide a method and apparatus for the collection and recovery of hydrocarbon pollutant spills.

It is further object of this invention to provide a hydrocarbon pollutant spill collection and recovery system which utilizes magnetic principles.

It is still further object of this invention to provide a magnetic collection and recovery system which allows the efficient recovery of pollutant and separation of the recovered pollutant from the sorbent medium.

It is a still further object of this invention to provide a hydrocarbon pollutant sorbent which may be quickly and efficiently separated from the pollutant by mechanical means for re-use in the pollution recovery process.

It is a still further object of this invention to provide a magnetically susceptible pollution-bonding sorbent.

It is a still further object of this invention to provide a mechanical recovery unit which magnetically collects and recovers a hydrocarbon pollutant saturated absorbent, separates the pollutant from the sorbent, and redistributes the sorbent for further use in the pollutant collecting and recovery operation.

SUMMARY

It has now been discovered that hydrocarbon pollutant spills which are borne on the surface of an aquatic medium may be collected and recovered by distributing a plurality of buoyant, magnetically susceptible, oleophillic, hydrophobic, resilient sorbent particles on the surface of the hydrocarbon pollutant, allowing the sorbent to attract and bind the hydrocarbon pollutant, magnetically collecting the pollutant-bound sorbent particles, compressing the pollutant bound sorbent particles to expel the pollutant to a pollutant sump, allowing the compressed sorbent particles to recover from compression, and redistributing the sorbent particles on the surface of the remaining pollutant. It has also been discovered that a recovery unit apparatus for the collection and recovery of a hydrocarbon pollutant spill which is borne on the surface of an aquatic medium may be fabricated as a surface going aquatic vehicle comprising a buoyant pollutant storage tank, a rotatable cylindrical drum mounted to the storage tank normal to the relative flow of the aquatic medium, a plurality of magnetic bands mounted circularly about the drum in parallel spaced relation, means for rotating the drum, means for wiping the drum, means for compression, a sorbent storage and distribution hopper, means for conveying communicating from said means for wiping through said means for compressing to said sorbent storage and distribution hopper, a pollutant sump beneath said means for compressing, pollutant storage tank and said pollutant sump, and means for propelling said vehicle through said aquatic medium. It has also been discovered that an alternative collection and recovery apparatus may include a magnetic rake having an elongated handle, support cross-member mounted normal to the handle at a point intermediate the handle length and adjacent a first end of the handle, a plurality of elongated magnetic tynes mounted along the cross-member in parallel spaced relation and extending parallel to the handle, a reciprocating pressing member having a plurality of tyne-accepting holes spaced along its length and adapted to reciprocatingly mount to the tynes and parallel to the support cross-member and to be reciprocable from a first position adjacent the support cross-member to a second position remote from such cross-member, and means for reciprocating mounted to said handle and connected to said pressing member. It has also been discovered that a magnetically susceptible sorbent particle suitable for use in conjunction with the method and apparatus hereinabove summarized for pollutant spill control may be fabricated from a resilient, oleophillic, hydrophobic, synthetic plastic substrate and a plurality of non-abrasive magnetically susceptible particles imbedded in and substantially evenly distributed throughout said substrate so as to form a sorbent having a density of less than that of the aquatic medium.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DESCRIPTION OF THE PREFERRED EMBODIMENTS

Referring to FIGS. 1, 2, 3, 4, and 6 there is seen a recovery unit constructed in accordance with the preferred embodiment of the invention indicated generally at 10. Recovery unit 10 is constructed having a pair of hollow elongated pontoons 12 and 14 respectively held in parallel, spaced relation to each other by rigid connectors 16 rigidly mounted therebetween and spaced at regular intervals along the length of the pontoons. A three-sided drum yoke, having first side 22, a second side 24 and a third side 26, is pivotally mounted to the two pontoons 12 and 14 respectively by pivot brackets 28 and 30 respectively such that the drum yoke is upwardly pivotable, by any suitable mechanical means, not shown, from a lowered position in contact with rearward portions 18 and 20 of pontoons 12 and 14 respectively to a raised position wherein third side 26 is upwardly displaced from rearward ends 18 and 20 and sides 22 and 24 form acute angles with their respective pontoons.

Magnetic pick-up drum 32 is rotatably mounted to and between drum yoke sides 22 and 24 at points intermediate their length such that drum 32 is rotatable about a longitudinal axis defined by the mounting points and such that the lower portion of drum 32 will be substantially immersed in any aquatic medium upon which the recovery unit 10 is launched. As shown, drum 32 is preferably fabricated as a hollow cylinder in order to reduce its weight and is securely sealed to prevent the ingress of water, pollutant, or the like. Securingly engaged about the circumference of drum 32 are a plurality of magnetic belts 34 arranged in parallel spaced relationship along the length of the drum. Each such magnetic belt 34 comprises a plurality of individual bar magnets approximately 2 inches in length which are bonded in tangential relation to the drum 32 by any suitable adhesive. Magnetic belts 34 extend outwardly of the drum surface, and the entire surface of the drum magnetic belt assembly is sealed with a suitably corrosion resistant sealer which prevents direct contact between the metallic surface of the assembly and the corrosive aquatic media. By virtue of the magnetic belts, the profile of the curved surface of drum 32 is notched.

Two L-shaped skid plates 36 and 38 are rigidly mounted to first side 22 and second side 24, respectively, of the drum yoke rearwardly adjacent pivot mounts 28 and 30 and are rigidly attached to, and supported by, skid plate support bar 40 which is rigidly mounted to and between sides 22 and 24 between the skid plate and the drum 32. A wiper assembly, indicated generally at 40, is rigidly mounted to the drum yoke and extends thereabove. Wiper assembly 40 comprises a wiper blade 42 having a plurality of notches sized and shaped to compatibly extend along the length of, and closely adjacent to, the notched cylindrical surface of drum 32, a take off chute 44, having sides 46, rigidly connected to and supporting the wiper blade and sloping downwardly and inwardly therefrom to a flexible lip 48. As indicated in FIGS. 1 and 2, wiper assembly 40 extends from wiper blade 42, which is mounted immediately adjacent the upper forward portion of drum 32, forwardly and downwardly to flexible lip 48 which is held at the approximate level of the uppermost portion of pontoons 12 and 14.

A storage and distribution hopper 50 is rigidly mounted to and between pontoons 12 and 14 at a position thereon adjacent the forward ends thereof. Hopper 50 comprises an enclosure having an openable top 52, inner sidewalls 54 which are sufficiently angled to allow the free descent therealong of particulate materials, and a bottom having a variable speed feeder means 56, preferably a rotary star feeder, of sufficient size to distribute particulate matter contained within hopper 50 onto the surface of the aquatic medium beneath the hopper 50 and between pontoons 12 and 14.

Figure 1:
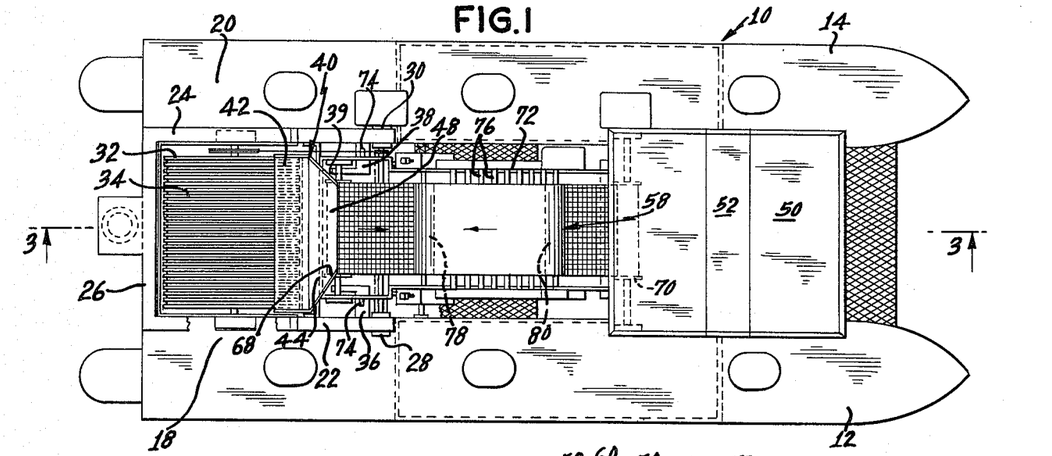
FIG. 1 is a top plan view of a recovery unit constructed in accordance with the preferred embodiment of the invention.
Figure 2:
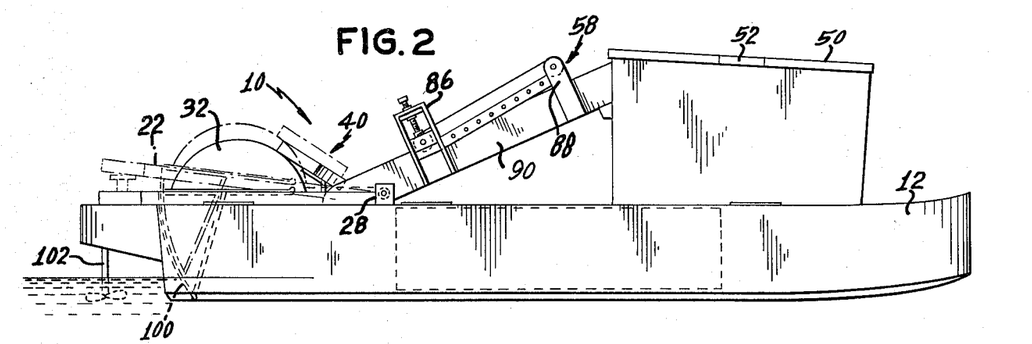
FIG. 2 is a side elevational view of the unit of FIG. 1.
Figure 3:
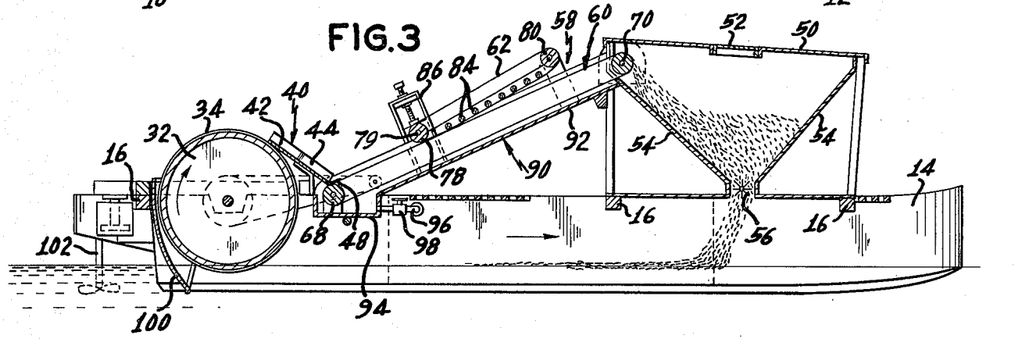
FIG. 3 is a vertical section taken along line 3—3 of FIG. 1.
Figure 4:
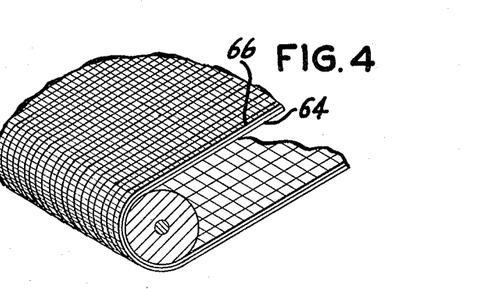
FIG. 4 is a perspective view of a lower mesh belt utilized by the recovery unit.

Referring to FIGS. 1 and 2, there is seen a wringer-compressor apparatus, indicated generally at 58. Apparatus 58 generally comprises a lower mesh belt 60 and an upper pressure belt 62. Lower mesh belt 60 may be constructed as a continuous loop of any suitable mesh material which will allow liquid to drain readily therethrough and which is impervious to attack by said liquid. In the preferred embodiment, lever mesh belt comprises an inner support belt 64 fabricated from a steel mesh material having relatively high resistance to deformation and having a relatively large mesh size, and an outer carrying belt 66 of a relatively small mesh size and greater flexibility, such as a neoprene mesh. The preferred utilization of two belts, 64 and 66, in lower mesh belt 60 results in a combination which exhibits the strength of the steel mesh belt 64 while having the benefit of the resiliency and small mesh size of the neoprene belt 66. Lower mesh belt 60 is extended from a rearward most point beneath and rearwardly of flexible lip 48 and sufficiently proximate to flexible lip 48 that lip 48 is in contact with the topmost side thereof, forwardly and upwardly to a forwardmost point within the storage and distribution hopper 50.

Lower mesh belt 60 is supported by, and extends between and about rearward roller means 68 and forward roller means 70 which means are, in turn, rigidly held in parallel spaced relation, in order to provide lower mesh belt with sufficient tension, by a pair of elongated mesh belt spacers 72, which are disposed outwardly on either side, respectively, of lower mesh belt 60. Roller means 68 and 70 may each comprise an axle, rigidly held by and between spacers 72, which carries a plurality of circular sprocket wheels for movably engaging belt 60 or may each comprise a roller rigidly held by and between spacers 72 and equipped with belt engaging means. Spacers 72 are each equipped with an outwardly projecting slide nub 74 at points respectively thereon adjacent their rearward ends and adapted by and slidably supported by skid plates 36 and 38. In addition, spacers 72 support a plurality of compression blocks 76 in parallel spaced relation intermediate of the length of lower mesh belt and immediately beneath the topmost portion of the belt such that the lower mesh belt will be supported during the application of a compression force as further described hereinbelow.

Upper pressure belt 62 comprises a flexible continuous loop belt fabricated from a flexible impermeable material such as a reinforced neoprene which is mounted about parallel spaced pressure belt rollers 78 and 80 which are adjustable rigidly held relative to each other by a pair of pressure belt spacers 82 disposed respectively on either side of pressure belt 62. A plurality of idler rollers 84 are rotatably mounted to and between spacers 82 parallel to pressure belt rollers 78 and 80 and at a level sufficiently lower than rollers 78 and 80 to apply a downward tensioning force upon the lowermost side of pressure belt 62 and interiorly thereof. Pressure belt spacers 82 are rigidly adjustably mounted to mesh belt spacers 72 by a take-up frame 86 at the rearward end of pressure belt spacers 82 and by a tension adjuster 88 adjacent the forward end of spacers 82. Pressure belt roller 78 is adjustably rigidly mounted to take-up frame 86 through axle 79 such that the lowermost rearward point of pressure belt 62 may be adjusted downwardly toward, and into contact with, lower mesh belt 60. Tension adjuster 88 adjustably mounts pressure belt spacers 82 to mesh belt spacers 72 such that pressure belt 62 may be downwardly adjusted into contact with mesh belt 60 and forced thereagainst with any desired amount of pressure. Idler rollers 84 are positioned with respect to pressure blocks 76 such that the pressure applied to lower mesh belt 60 by pressure belt 62, as a result of adjusting tension adjuster 88 and take-up frame 86, may be applied at a plurality of points intermediate the run of the belts.

As shown in FIGS. 1 and 2 and as described hereinabove, lower mesh belt 60 extends upwardly and forwardly from a point beneath flexible lip 48 to a point interiorly of hopper 50. Roller 70 is rigidly rotatably mounted to and interiorly of hopper 50 such that passage of lower mesh belt 60 over the top of roller 70 and thereabout occurs interiorly of hopper 50.

Lower mesh belt 60 is operatively connected with actuation means, not shown, such as an electric or internal combustion motor which is operatively connected, through any suitable power transmission means, such as a drive chain or pully, not shown, to roller means 70, such that operation of the actuation means will cause roller means 70 to rotate thereby initiating continuous loop movement of lower mesh belt 60.

Pressure belt 62 is caused to assume a continuous loop movement such that the lowermost surface of pressure belt 62 and the uppermost surface of mesh belt 60 track at substantially equal speeds and in the same direction, by the use of any suitable reversing gear mechanism, driven by the motive force of the lower belt and operatively connected to pressure belt roller 80, by suitable power transmission means. In order to accommodate the relative adjustability imparted between pressure belt roller 80 and lower mesh belt 60 by tension adjuster 88, an idler sprocket, preferably spring loaded, may be utilized to maintain sufficient tension in the power transmission means connection between the reversing gear and pressure belt roller 80 to prevent slippage and resultant power loss.

An elongated drain pan assembly 90 is rigidly mounted beneath lower mesh belt 60 and extends substantially parallel thereto from a point adjacent to, and beneath mesh belt roller means 70 to a point adjacent to, and beneath mesh belt roller means 68. Drain pan assembly comprises an elongated drain chute 92 of sufficient width and having sidewalls of sufficient height to catch and carry any liquid which drains through lower mesh belt 60. Chute 92 extends rearwardly and downwardly to a drain sump 94 which extends beneath mesh belt roller 68 and rearwardly thereof to a point beyond roller 68. Drain-sump 94 is connected, through liquid conduit 96 to pontoons 12 and 14 and is sized and shaped such that its volume is sufficient to be a temporary repository for liquid in transit between drain chute 92 and pontoons 12 and 14. Liquid conduit 96 may be equipped with any suitable flow directing or interrupting means such as valve 98 in order to control the volume and direction of flow of liquid therethrough.

A breakaway shield 100 may be mounted to third side 26 of the drum yoke and extend substantially parallel to the rearward surface of drum 32 such that particulate matter which escapes pick-up by the drum may be entrained by the shield and carried upwardly therealong into the proximity of the drum for attraction thereto. The shield is preferably mounted to the drum yoke in such a manner as to be adjustable as to the depth of immersion and in such a manner as to pivotally yield in a rearward direction in the event of collision with a partially or completely submerged object of sufficient size and weight.

Means for propelling and steering the recovery unit 10 along the surface of the aquatic medium are detachably mounted to the rearward ends 18 and 20 of pontoons 12 and 14 respectively such that the recovery unit may be propelled and oriented during propulsion in any desired direction. Such means for propelling may comprise any suitable means such as one or more inboard or outboard motors 102, paddle wheels, etc. or may comprise a second aquatic vehicle which is used to push the recovery unit in the desired direction.

Figure 5:
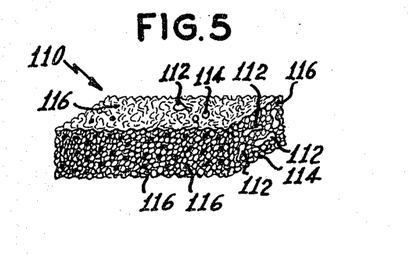
FIG. 5 is a perspective view of a magnetically susceptible sorbent particle constructed in accordance with the invention.

Referring to FIG. 5 there is seen a sorbent particle 110 suitable for use in the method and apparatus for pollutant spill recovery of the invention. Sorbent 110 is fabricated from a synthetic polymer which has been blown sufficiently to form a network of both open cells 112 and closed cells 114. A plurality of non-abrasive magnetically susceptible particles 116, such as iron platelets or iron shot of from about 10 to about 40 mesh are imbedded in the cellular wall structure, substantially evenly distributed throughout the particle so as to result in a particle density of from about 5 lb/ft$^3$ to about 20 lb/ft$^3$ such that the sorbent particle is buoyant on fresh water or other aquatic medium.

The selection of suitable synthetic polymer is not critical to the utility of the sorbent, but is made generally on the basis of the chemical and physical properties which are obtained in the final sorbent particle. Among those chemical and physical properties of the polymeric material required are the preferential attraction for, and wettability by, hydrocarbon based liquids such as oils, kerosenes, napthas and the like over water. For ease of notation these properties are referred to hereinafter as oleophillicity and hydrophobicity. In addition the physical characteristics required of the synthetic polymeric foam are: a density less than that of water; compressibility to a fraction of the uncompressed volume of the foam particle; resiliency, which property is herein defined to mean recovery of volume following compression to the majority of the uncompressed volume within a period not greater than one hour; durability to repetitive compressions and recoveries, such that disintegrative destruction or loss of resiliency be avoided; nontoxicity to marine vegetable and animal life; and insolubility or sparing solubility in both aqueous and hydrocarbon solvents of the type noted hereinabove. Within the restrictions on physical and chemical characteristics set forth hereinabove, any foamable synthetic polymeric material may be selected for the fabrication of sorbent particles 110. Such polymeric materials include, but are not limited to polyurethanes; sponge rubber, latex, polyolefins, polyvinyl chlorides, silicones, polystyrenes, urea-formaldehydes, polyvinyl alcohol-formaldehydes, epoxys, acrylonitriles, and acrylate copolymers, pyranyls, polyethylenes, acrylonitrile-butadienestyrene copolymers and cellulose acetate. All these and many other polymeric materials which may be foamed into low density, compressible, resilient, oleophillic, hydrophobic, non-toxic, relatively insoluble particles are well known to those skilled in the polymer fabrication art and are readily commercially accessible either through direct laboratory fabrication or commercia polymer suppliers. The reaction chemistry of such foamed plastic materials is well known in encyclopedic works (*Encyclopedia of Polymer Science and Technology*, Volume 3; and *Encyclopedia of Chemical Technology*, "Foamed Plastics"), in textbooks (Frisch and Saunders, *Plastic Foams*, Volume I, Dekker, Inc., New York, 1972; Benning, *Plastic Foams*, Wiley-Interscience, New York, 1969), and in literally thousands of scientific publications. Even in those instances where the polymeric foam does not ordinarily possess one or more of the necessary characteristics, there exist several alternative methods well known to those skilled in the art for the formulation of a foam having that property by the use of appropriate additives such as catalysts, cross-linking agents and nucleating agents, the basic polymer mixture, as well as the use of varied temperature, pressure or other factors of the foaming operation itself.

Of the utmost criticality to the successful fabrication of a synthetic polymeric sorbent particle for use as a recyclable sorbent is the choice of a magnetically permeable particle for inclusion in the sorbent which is sufficiently benign toward the cellular foam structure during compression to avoid disintegrative destruction of the cell walls. Two critical factors appear to exist which determine the rate of deterioration of the foam cell matrix.

The first of these factors is particle size, and is divisible into two competing aspects. The first aspect is the amount of magnetic permeability which is evidenced by a magnetically susceptible particle as a function of particle size. Experimentation with various size iron particles from fine powder to 40 mesh has resulted in the empirical observation that, at equal weights of iron per unit volume of polymeric foam, the strength of magnetic attraction between a standard magnet and equal sized foam particles decreased as iron particle size decreased. Thus the permeability aspect of magnetic foam formulation appears to dictate the use of larger particle sizes in order to increase the efficiency of magnetic collection.

The second aspect is the degree of cell structure defects necessarily introduced into the foam by the inclusion of a foreign material such as iron particles. Experimental results from the compression and resilience testing of identical foams loaded with equal weights of iron having varying particle size indicate that cell wall integrity under continuous compression-release cycles is reduced as the size of the foreign (iron) particle is increased. Such a decrease in cell wall integrity with increasing particle size appears to be explainable in terms of a point defect theory in which the relation between cell wall size and thickness and particle size is critical to the ability of the physical bond formed between the particle and the synthetic polymer. Thus for smaller iron particles wich induce small point defects in the cell wall, sufficient elasticity in the remaining continuous polymer structure surrounding the point defect appears to exist to provide a mechanism for relief of compression stress without resort to the shearing of the particle-polymer bond. On the other hand, the inclusion of a iron particle within the cell wall which a large point defect appears to allow insufficient elasticity in the remainder of the cell wall to relieve the stress of compression without the shearing of the bond between particle and polymer.

As a result of the two mutually opposed aspects, i.e. the permeability aspect and the point-defect aspect, the size of magnetically susceptible particles which may be included within the polymeric cell matrix is restricted to a range of from about 100 microns to about 1500 microns, and preferably from about 700 to about 1000 microns.

The second and most important factor is the abrasiveness of the magnetic particle. Iron filings and shavings, as well as iron powders obtained from milling operations, are highly abrasive due to the sharpness of the particle edges resulting from their method of production. In addition, many of these types of particles are deformed out of a regular or planar shape to form convoluted shapes. As a result the inclusion of such particles within a cellular wall matrix, results in a literal cutting or shearing of the cell walls during compression of the cellular foam resulting in rapid collapse of the cells and deterioration of the resiliency of the foam sorbent. This cutting or shearing appears to be operative in addition to the point-defect aspect of cell wall shear under compression set forth hereinabove. The selection of a magnetic susceptible particle having a platelet or generally spherical shape reduces or eliminates particle-edge shear as a destructive mechanism in the sorbent foams of this invention. Thus by the choice of a non-abrasive particle having a size of from about 1500 to about 100 microns and preferably from about 1000 to about 700 microns a recyclable hydrocarbon sorbent foam may be fabricated which exhibits a minimum disintegrative destruction throughout several compression-recovery cycles.

EXAMPLE I

This example sets forth a method of preparation of a preferred sorbent for use in the collection of hydrocarbon pollutant spills. All parts are by volume unless otherwise noted. 100 parts of "Hypol 3000 FHP" (Trademark of W. R. Grace polyurethane toluene diisocyanate prepolymer), 37.5 parts of "PAPI 135" (Trademark of Upjohn Co. polymethylene polyphenyl isocyanate crosslinking agent) and 1.25 parts of "L-520 Surfactant" (Trademark of Union Carbide Corp. polysiloxane nucleating agent) are thoroughly mixed together to form a component A solution.

1.5 parts of "Thancat D. D. Catalyst (Trademark of Jefferson Chemical Co. tertiary amine catalyst) is diluted with 137.5 parts of water to form a Component B solution.

Components A and B are mixed thoroughly at approximately 25% and 50% relative humidity and 100 parts (2.9 g/cc) of 20 mesh GLIDDEN A-172 Iron Powder" (Trademark of Glidden-Durkee Co. iron platelets) added immediately after mixing with homogenizing mixing. The resulting foaming mixture was transferred to a molding vessel and the foaming/curing mixture allowed to rise for approximately 10 minutes. The cured foam was cut into one inch cubes for physical parameter measurement.

EXAMPLE II

The apparent density of the sorbent foam produced in Example I was determined according to Sections 75–80 ASTM Designation D-1564-69.

Test specimens 2.54 cm×2.54 cm were cut as described. The specimen was weighed on a Mettler balance so as to permit weighings within ±1 percent of the weight to be measured. Dimensions of the specimen were determined in accordance with Section 4. The density in grams per cubic centimeter was calculated as follows:

$$\text{Density} \times A/B$$

Where $A$ = weight of specimen (grams)

$B$ = apparent volume of specimen (cm)$^3$

The above procedure was repeated for a minimum of 7 samples. The highest and lowest values of density were discarded and an average sample density was obtained with the remaining values. Comparison was made between each specimen density and the average density with specimens deviating from the average by greater than 4 percent being discarded. The remaining samples were utilized for all further tests.

The apparent dry density of the foam was calculated to be 0.214 g/cm$^3$ (13.4 lb/ft$^3$).

EXAMPLE III

The compression set of the sorbent foam produced in Example 1 was determined according to sections 12–18 ASTM Designation 1564-69.

This method consisted of deflecting the foam specimen under specified conditions of time and temperature and noting the effect on the thickness of the specimen. The compression device consisted of two flat plates arranged so the plates were held parallel to each other by allowing movement to be guided along two fixed rigid columns. The space between the plates was adjustable to the required deflection thickness by means of a fine screw and bearing mounted on the upper plate. Test specimens of dimension 2.54 cm×2.54 cm were cut as described. Following density measurement for uniformity as described in Example II test specimens with parallel top and bottom surfaces and essentially perpendicular sides were selected. All measurements, conditioning and recovery of the specimens were conducted at 23°±1° C. and in an atmosphere of 59±2% relative humidity. Measurement of the initial thickness of the test specimen was made in accordance with the procedure described in Section 4. Following this measurement, the specimen was placed in the apparatus and deflected to 75% of its thickness. After a period of 22 hours compression, the sample was removed from the apparatus and measured in accordance with the procedure outlined in Section 4 after 50 min±10 recovery. (Note: Measurements for 5 min compression—5 min recovery were also conducted on similar samples.) Constant deflection compression set, expressed as a percentage of the original thickness, was calculated as follows:

$$c_t = [t_O - t_f)/t_O] \times 100$$

where $c_t$ = compression set expressed as a percentage of original thickness.

$t_O$ = original thickness of specimen.

$t_f$ = final thickness of specimen after removed from apparatus and allowed to set for specified recovery period.

The compression set determined by the test method was 12.8% for a 5 minute compression to 75% deflection followed by 5 minute recovery and 35% for a 22 hour compression to 75% deflection followed by a 55 minute recovery.

EXAMPLE IV

The load deflection of the sorbent foam of Example 1 was determined according to section 25–31 ASTM Designation 1564-69 Method B. Indentation (to specified loads).

This test is known as the indentation residual gauge load and the results as IRGL values. Load deflection is determined by measuring the thickness of the foam sample under fixed loads of 243.4 gm, 743.4 gm, and 1243.4 gm. An apparatus consisting of a flat 243.4 gm indentor foot (6.3 cm$^2$) mounted to slide along two rigid columns was used to achieve compression. Additional loads of 500 gm and 1000 gm were placed atop the foot and centered with the aid of a bubble level mounted on the indentor. Deflection measurements were made using a venier caliper mounted on the apparatus. Test specimens of dimensions 2.54 cm×2.54×2.54 cm (1"×1"×1") were cut as described. Samples of uniform density were selected in accordance with procedures described in Example 2. The specimen was preflexed 75 to 80% of its thickness twice before testing and allowed to rest for 10±5 min. The sample was then positioned in the apparatus and the indentor foot brought into contact with its upper surface to determine the thickness of the specimen under a minor load of 243.3 gm. A load of 500 gm was then applied to the indentor foot and the sample compressed until it carried the load. The thickness of the sample was determined after maintaining it under the 743.4 gm load for 1 min. Without removing the sample from the apparatus, 1000 gm was applied to the indentor foot which further compressed the sample until this weight was carried. After 1 min. under load the thickness of the sample was determined for the 1243.4 gm load. Finally, the indentor foot weight was reduced to 743.4 gm and the specimen allowed to expand until it just carried the weight. After maintaining this load for 1 minute, the specimen's thickness after 1 min. at 243.4 gm, 743.4 gm, 1243.4 gm, and 743.4 gm on return were recorded. These measurements are known as the IRGL values respectively.

The load deflection determined by the test method was 1.68 IRGL (first load weight of 743.4 gm.), 1.35 IRGL (second load weight 1243.4 gm), and 1.42 IRGL (third load weight 743.4 gm).

EXAMPLE V

The fatigue of the sorbent foam produced in Example 1 was determined according to section 52–72 ASTM Designation 1546-69 Procedure "C" Note: Changes to number of flexing cycles and percent compression were made from ASTM D1564-69 in order to accommodate existing equipment. The purpose of the fatigue test is to determine (1) a loss of load bearing properties (2) a loss of thickness, and (3) structural breakdown by visual examination. Test specimens of dimensions 2.54 cm×2.54 cm×2.54 cm were cut as described. Samples of uniform density were selected in accordance with procedures described in Example 2. An apparatus having parallel plates, one of which moved with respect to the other was used to produce uniform deflection of the specimen. The flexing plates of the device were 1.25 cm larger on each side than the specimen being tested and operated at 33 cpm. The sample was measured for thickness and for load deflection as indicated in Example 4. The same was then placed in the machine and the plate position adjusted so that the amplitude of flexing with respect to the specimen was 50% of the original thickness. The machine was run for a minimum of 50,000 cycles. Thirty minutes after the fatigue test was completed, the specimen was measured for thickness and for load deflection as indicated in Example 4. The specimens were checked for physical breakdown of the cellular structure by visual examination and comparison with unflexed specimens. The percentage loss of thickness was calculated as follows:

$$F_t = [t_O - t_f)/t_O] \times 100$$

where
$F_t$ = loss of thickness percent
$t_O$ = original specimen thickness
$t_f$ = final specimen thickness The percentage loss of load deflection was calculated as follows:

$$F_L = [L_O - L_f)/L_O] = 100$$

where
$F_L$ = loss of load deflection, percent
$L_O$ = original load deflection value
$L_f$ = final load deflection value The percent decrease of thickness after 50,000 cycles at 50% deflection was found to be 19.3%. The percent decrease of load deflection was found to be 32.1% (first load IRGL value), 21.5% (second load IRGL value) and 22.5% (third load IRGL value).

EXAMPLE VI

The magnetic attraction (magnetic force/weight ratio) of the sorbent foam of Example 1 was determined by a method consisting of measuring the break away force required for a standard 1300 gauss magnet and a standard 1" cube sample when the distance of separation is 0.65 cm. Test specimens of dimensions 2.54 cm×2.54 cm×2.54 cm (1"×1"×1") were cut as described. Samples of uniform density were selected in accordance with procedures described. The sample was placed on a precision laboratory beam balance and preweighed to with ±1% error. The sample was then removed and the pole of a standard 1300 gauss magnet was placed 0.65±0.02 cm under the sample pan. Weights were then added to the balance until the balance pan just overcame the magnetic force and broke away. (Note: non-magnetic pans were used in the measurements. Preliminary force data took into account any magnetic susceptability of the balance.) The sample was then placed on the measuring pan and weights were added to the balance until the pan just overcame the magnetic force and broke away. The magnetic force to weight ratio was calculated as follows:

$$M = [(F_2 - F_1)/W] - 1$$

where
M = magnetic force to weight ratio
$F_2$ = break away force required for sample + pan
$F_1$ = break away force required for pan
W = weight of sample As determined by the above described method, the magnetic force/weight ratio of the sorbent foam was 3.35.

EXAMPLE VII

The wettability and absorbency of the sorbent foam of Example 1 was determined by the procedure of Lichstein, Bernard M., in a paper published in 1974. Wettability comprises both absorbent capacity and wetting rate. The device is used to measure wetting rate in terms of volume, thereby giving partial capacity as a function of time and ultimately the total capacity. Fluid which exits from the fluid delivery hold just below the sample is continuous with that contained in the buret. As it flows from the buret, it is replaced by air at atmospheric pressure from the air bleed at the base of the buret. Fluid flows only when the pressure on the column of liquid is greater than the pressure of the atmosphere at the exit. This occurs when there is a finite hydrostatic head. The hydrostatic head of the apparatus is determined by the difference in height between the air bleed and where the fluid exits. The device was operated with the fluid exit at the same height as the air bleed, which resulted in a hydrostatic head of zero. The configuration of this apparatus is such that liquid will not issue from the fluid exit unless it is absorbed by the foam in contact with the fluid. When the foam ceases to demand liquid, the liquid ceases to flow. The presence of the absorbent foam is equivalent to temporarily imposing a hydrostatic differential between the air bleed and the fluid delivery hole. This differential varies only with the demand of the foam and is independent of the height of the liquid column. The buret was filled with No. 2 diesel fuel to simulate actual utilization. Froth in the oil due to rising air bubbles was minimized by the addition of a small amount of alcohol at the top of the column of oil. Test specimens of dimensions 2.54 cm×2.54×2.54 cm (1"×1"×1") were cut as described. Samples of uniform density were selected in accordance with procedures described. With the valves open, liquid is removed from the tubing connecting the activating mechanism to the tip of the air bleed. The height of the liquid colum is drained to some convenient height by placing absorbent material such as toweling over the fluid delivery hole. Wicking is initiated by momentarily closing off the open, tee-tube part of the wicking initiating mechanism while gently squeezing the rubber bulb. Wicking is stopped by removing the absorbent material. A preflexed, standard sample of foam was placed on the lower plate. The upper plate was then placed on the sample. Wicking was initiated as above. The rubber bulb was released as soon as wicking started. At the instant that wicking initiated, a timing watch was started. During the absorption process, liquid withdrawn from the buret is replaced by air. Volume and time readings were recorded every 30 seconds for a period of 2 minutes. Raw data was obtained as volume of oil absorbed (ml) as a function of time (seconds).

During the absorption process, air traveling between the bleed and the top of the liquid column in the buret displaces its own volume thereby giving a volume reading less than that actually withdrawn. This can also be viewed as the time elapsed being greater than is actually required to absorb the observed volume. Since absorption rates were slow and easily monitored for all foam samples, this correction had negligible effect on the final results and was omitted. Absorption rates were calculated for each 30 second interval (volume change during interval—(cc)/30 seconds) and averages 20 sec. cummulative times (total volume change from starting value/total time elapsed). Calculations of normalized absorption rates were made by dividing the internal ratio by the sample weight (cc/gm sec.). The 2 minute absorption time was longer than the period to be encountered in actual field use (30–60 seconds). Thus, absorption rates obtained at 30 seconds and 60 seconds intervals were more relevant to project design. In addition, the 2 minute period was much less than required to saturate the cube foam samples, eliminating the need to normalize absorption rates to sample dimensions.

The absorption ratio of the foam was determined to be 67% for #2 diesel oil and 7.5% for water. The rate of absorption for #2 diesel oil was determined to be 0.013 cc/sec for the first 30 seconds interval.

EXAMPLE VIII

The discriminitive absorption of the sorbent foam of Example 1 was determined by a method which consists of placing the foam specimen in an oil/water bath of specified concentration and noting the percent of absorption of oil to water. Test specimens of dimensions 2.54 cm×2.54×0.65 cm (1"×1"×¼") were cut as described. Twelve specimens were used for each test. An oil/water bath was prepared in which the thickness of the #2 diesel oil was adjusted to a specified level (0.5 mm–1.5 mm). The 12 dry samples were placed in the bath and allowed to soak for 60 seconds. Following this period, they were removed from the liquid surface with a magnetic trowel. After allowing approximately 10 seconds to drain, each sample was individually hand wrung into a graduated cylinder. Following the separation of oil and water in the graduated cylinder, readings of amounts of each liquid were made to within 1% of the measured volumes. The oil and water was returned to the bath and an addition of oil was made, if necessary, to bring the oil film thickness to the specified level. The 12 samples were again placed in the oil/water bath and allowed to soak for 30 seconds before removal and wringing. The soak-wring cycle was repeated for 20 cycles with oil/water measurements taken after each 30 second soaking period. The percent of oil to total liquid absorbed was calculated as follows:

$$D = \frac{V_d}{V_d + V_w} \times 100$$

Where
$D$=percent diesel oil absorbed to total liquid absorbed
$V_d$=volume of oil released upon wringing
$V_w$=volume of water released upon wringing The ratio of oil/water absorption was determined to be 96/4 for the intial cycle and 60/40 for the 20 cycle experiment.

EXAMPLE IX

The absorption ratio and the percent retention of the sorbent foam of Example 1 were determined by a method which includes the determination of the surface volume open to oil absorption of urethane foam by measuring the change of buoyant forces resulting from immersion under a 3.8 cm (1.5") head of #2 diesel oil for 15 minutes. A submersible weighted sample cage was constructed from galvanized wire of dimensions 3.8 cm×3.8 cm×3.8 cm (1.5"×1.5"×1.5") so that the specimen was allowed to float against the cage top when submerged. To the base of the cage was attached a standard 100 gm weight. The entire weighing cage was attached to an analytical balance by means of stainless steel wires and submerged in a container of #2 diesel oil. Test specimens of dimensions 2.54 cm×2.54 cm×2.54 cm (1"×1"×1") were cut as described. Samples of uniform density were selected in accordance with procedures described.

The specimen was weighed on a balance or graduated scale so as to permit weighing with ±1% of the weight to be determined. Dimensions of the specimen were determined. The empty cage was submerged in the oil container (all air bubbles clinging to the sides were removed with a spatula) so that its top side was 3.8 cm below the oil surface, and weighed on the analytic balance. The weighing jug was removed from the oil bath and the specimen placed within the sample cage. The sample plus cage was then placed in the oil container to the 3.8 cm depth (all air bubbles clinging to the sides of the cage were removed with a spatula). After a 15 min. period, the cage and sample were weighed on the analytic balance while still submerged. Following 15 min. submersion the specimen was allowed to drain vertically for a period of 1 min. after which the sample was again weighed. Finally, the drained sample was hand wrung before a last weighing was performed.

The surface volume in cm$^3$ was calculated as follows:

$V_s = [W_3 - W_2 - W_1 + (V_A \times p)]/p$ where
$V_s$=surface vol. available for absorption (cm$^3$)
$W_3$=submerged weight of jug and specimen after immersion period (gm)
$W_2$=weight of empty submerged jug (gm)
$W_1$=dry weight of specimen (gm)
$V_A$=apparent specimen volume (cm$^3$)
$p$=density of oil
Absorption ratio was calculated as:

$A = V_s/V_A \times 100$ where
$A$=absorption ratio in percent
$V_s$=surface vol. (cm$^3$) $V_A$=apparent specimen vol. (cm$^3$)
Saturated specimen weight was calculated as:

$W_s = W_1 + (V_s X p)$ where
$W_s$=saturated sample wt. (gm)
Percent retention after draining was calculated as:

$R_o = W_o/W_s \times 100$ where $R_o$ = % retention of oil after 1 min. drain period
$W_o$ = weight of sample after 1 min. drain period (gm)
(Note: Values of $R_o$ may be greater than 100% when adhesive forces between the foam and liquid are high.)
Percent retention after wringing was calculated as $$R_W = W_W/W_s \times 100$$

where
$R$ = % retention of oil after designated hand wringing
$W_W$ = weight of sample after designated hand wringing Wrung weight to dry weight ratio was calculated by:

$$B = W_W/W_1$$

where
$B$ = wrung weight to dry weight ratio.

The absorption ratio determined was 67% for #2 diesel oil and 7.5% for tap water. Percent retention upon draining was determined to be 97%, and percent retention upon wringing was determined to vary between 20 and 40% depending upon the wringing pressure applied.

Of particular importance to the present invention are the effects of the non-abrasive iron platelet particles on the cell wall matrix as indicated by the results of the compression set tests (Example III) all percent decrease in thickness (Example V) due to the fact that sorbent integrity under both static deflection and continuous compression recovery cycles is the key factor to the development of a recyclable hydrocarbon pollutant sorbent. Values reported in Example III for the optimum foam sorbent produced in accord with the procedures outlined in Example I indicate that the foam lost only 12.8% of its thickness after a five minute compression to 75% deflection and lost only 35% of its thickness after a 22 hour compression to 75% deflection. From these results, it does not appear that cell wall disintegration occurs to any significant extent under static load conditions. Of perhaps even greater significance to the ultimate use of the foam sorbent in continuous recycling operation are the results of Example 5 which indicate that, after 50,000 deflections of the sorbent to 50% of its unloaded thickness, less than 20% of the original thickness was lost. Once again, cell wall disintegration due to iron particle edge abrasion does not appear to be a problem. Thus it appears that the use of a non-abrasive iron particle in the production of magnetically susceptible hydrocarbon sorbents results in increased sorbent integrity over extended compression-recovery cycle periods.

While the formulation and properties of the polyurethane magnetic foam sorbent disclosed in the foregoing examples are believed to be the optimum for the intended use of hydrocarbon pollutant, a relatively wide range of polyurethane formulations may be included within even a preferred category. Acceptable polyurethane foams may be produced utilizing the following ranges of ingredients (based on 100 parts of the basic polyurethane toluene diisocyanate prepolymer): "PAPI 13S" (Upjohn) polymethylene polyphenylisocyanate—15 to 40 parts; "L-S20 (Union Carbide) polysiloxane nucleating agent"—0.5 to 1.5; "Thancat D.D." (Jefferson Chemical Co.) tertiary amine catalyst—1.0 to 2.0 parts; and "Glidden A-172" (GLIDDEN-DURKEE) 20 mesh iron platelet powder—75 to 125 parts.

The selection of the aforementioned proprietary products, i.e. "Hypol 3000", "PAPI 135", etc. for use in the formulation of the sorbent was made solely on the basis of ready availability and compatability with foam production equipment on hand. No criticality appears to exists in the selection of polyurethane polymer starting materials, and, in general, the preferred polymer for use in fabrication of the sorbent of this invention is restricted only to polyurethane foams fabricated according to any of the well known methods such that the properties of the final sorbent, eg., oleophillicity, hydrophrobicity, resilience, etc., are consistent with the envisioned end use.

Notwithstanding the choice of polyurethanes as the preferred class of polymer for the fabrication of the sorbent of this invention, the sorbent may be fabricated from among any of the broad categories of synthetic polymers which may be fabricated into flexible foams having the necessary physical characteristics hereinbefore noted. Polyvinyl chloride resins, softened by the addition of appropriate amounts of any one of the well known plasticizers such as di 2-ethylhexylphthalate (DOP) and tricresyl phosphate, and blown into a vinyl plastisol foam having the desired degree of open and closed cellular structure; sponge rubber formulations from natural rubber, polyisoprene or polybutadiene, blown, with agents such as sodium bicorbonate, to appropriate cellular structure and apparent density; latex foams such as those blown from polyisoprene, polybutadiene, neoprene, butadiene-styrene mixtures; Acrylonitrile=butadiene elastomers; and silicone foams are only a small part of the conceivable multiplicity of polymeric materials which may be utilized to fabricate the sorbent of this invention. The choice of polymeric substrate is limited only by the ability of the polymer to be fabricated into a sorbent having the necessary physical characteristics. Among the characteristics necessary for foam suitability are the following, with preferred characteristics indicated in parenthesis where applicable: Dry density of from about 5 to about 20 (10–15) lbs/ft$^3$; average cell diameter (open and closed) of from about 0.01 to about 0.10 (0.02–0.05) cm; magnetic force to weight ratio of not less than about 2.0 (3.0); absorption ratio (#2 diesel oil) of not less than about 0.25 (0.50); absorption ratio (water) of not more than about 0.20 (0.10); percent decrease of thickness experienced after 50,000 compression cycles to 50% deflection of not more than about 50% (30%); an oil to water absorption ratio of not less than about 1.5 (9.0); a percent retention of hydrocarbon liquid after drainage of not less than about 50% (80%); and a percent retention of hydrocarbon liquid after wringing of not greater than about 50% (30%). A synthetic polymer foam having characteristics falling within these broad ranges and having a plurality magnetically susceptible non-abrasive iron platelets or iron shot of from about 100 to about 1500 microns in size will be suitable for use in conjunction with the method and apparatus hereinabove described for the collection and recovery of hydrocarbon pollutant liquids borne on the surface of an aquatic medium.

The choice of size and shape of the sorbent particles is of only minor importance to the sorption aspect of the particle functionality. Virtually any size particle will absorb or adsorb pollutant so long as the particle size is sufficiently large to contain a significant cellular matrix and to maintain a magnetic force to weight ratio for the saturated particle within the broad functional range. However, the choice of particle size is of major importance to the compatability of sorbent particle and compression apparatus. Thus particles having a size less than about 1 cm require a pod size in the lower mesh belt of the recovery unit on the order of 1-2 mm in order to avoid plugging of the mesh and particle loss. Conversely, particles having a thickness in excess of 10 cm will absorb so little pollutant during the contact period that the compression operation will expel little or no pollutant but rather will merely redistribute the pollutant throughout the sorbent particle. Thus, in general, the thickness of the sorbent particle should be maintained at not less than about ⅛ in. thickness of the pollutant layer. The length and width dimensions may vary between about ½ in. × ½ in. and substantially larger such as 12 in. × 12 in. or even larger. Preferred dimensions are from about ⅛ in. × ¾ in. × ¾ in. to about ½ in. × 4 in. × 4 in. with an optimum sorbent particle having dimensions of ¼ in. × 1 in. × 1 in.

In operation, the recovery unit is supplied with a plurality of sorbent particles which are stored in the hopper 52, and is propelled by propelling and steering means 102 to a position within an aquatic borne pollutant spill. Rotary feeder 56 is actuated thereby distributing a continuous feed of sorbent particles upon a portion of the surface of the pollutant spill between pontoons 12 and 14. Propelling and steering means 102 are actuated to propel the unit forwardly thereby causing the unit to move through the spill and causing the distributed sorbent particles to approach the magnetic field of drum 32. By virtue of the movement of the unit relative to the surface of the spill, the continuous distribution of sorbent will cause a layer of sorbent to be distributed over that portion of spill surface which is brought beneath the feeder. During the time necessary for the sorbent to travel the distance between the feeder and the drum surface, the sorbent, due to its oleophillicity and hydrophobicity will absorb and/or adsorb a quantity of the pollutant. As the partially or fully saturated sorbent approaches the drum, the magnetic forces generated by the magnetic bands about the drum surface will attract the magnetically permeable iron particles within the sorbent with increasing force, resulting ultimately in contact between sorbent and drum, which contact is maintained by the magnetic force.

As the recovery unit is propelled, the drum rotating means are actuated such that the lower-most surface of the drum is rotated at substantially the same speed, and in the same peripheral direction, as the relative flow of the pollutant spill surface. By virtue of this speed and direction of drum rotation, relatively little disturbance of the spill surface will occur and, therefore, the magnetic attraction forces holding the saturated sorbent particles to the drum surface will encounter a minimum of disturbance. As the drum rotates, sorbent particles are initially attracted to and held by, that portion of the drum surface at the level of the spill. Once the sorbent particles are held by the drum, the rotation of the drum will drag the saturated sorbent beneath the surface to, and through, the lowermost point of rotation and then upwardly through the surface of the aquatic medium on the rearward side of the drum. As the drum rotation continues, the saturated sorbent particles are carried upwardly around the top of the drum and into contact with the wiper blade 42 of the drum wiping appratus, mechanically separating the saturated sorbent particles from the drum surface. By virtue of the downward and forward inclination of the wiping apparatus, the sorbent particles are caused to slide or tumble therealong, over the flexible lip 48 and onto lower mesh belt 60.

Lower mesh belt 60 and upper pressure belt 62 are driven by belt actuation means and power transmission means such that the saturated sorbent particles leaving flexible lip 48 are carried therealong in a forward direction toward take-up frame 86 and rearward pressure roller 78.

Take-up frame 86 and tension adjuster 38 are individually adjusted such that the pressure belt 62, through forward and rearward pressure belt rollers 80 and 78 as well as idler rollers 84, applied any desired amount of pressure to lower mesh belt 60 sufficient to compress the saturated sorbent particles.

As the saturated sorbent particles, carried by the upper run of lower mesh belt 60, pass beneath rearward pressure belt roller 78, the particles are subjected to a compression pressure causing the reduction in volume of the particles and the expulsion of absorbed and adsorbed pollutant. Intermittent compression and release may be caused to occur, to the particles if desired by the adjustment of the position idler rollers 84 with respect to pressure blocks 76.

As the compressed sorbent particles, from which some or all of the pollutant has been expelled, pass forwardly of forward compression belt roller 80, the compression force is released and the sorbent particles are allowed to recover to their pre-compession volume. The expanding sorbent particles are carried by lower mesh belt 60 to hopper 52 and are deposited therein as belt 60 passes over and beneath forward mesh belt roller 70. The sorbent particles are thereby deposited on the inclined walls 54 of hopper 52 and tumble therealong to form a portion of the sorbent particle reservoir for ultimate redistribution through the feeder onto the surface of the pollutant for a subsequent recovery cycle. During their residence time in the hopper, the particles continue to recover to their pre-compression volume such that their sorption properties are sufficient to function as a pollutant spill sorbent.

The pollutant which is expelled from the sorbent particles during compression drains through the mesh network of lower mesh belt 60 and onto drain chute 92. As a result of the downward and rearward inclination of chute 92, the liquid pollutant is caused to flow therealong into the drain sump 94 from which the pollutant flows through conduit 96 into pontoons 12 and 14 for storage.

By the use of such a method of pollutant collection and recovery which comprises distributing the sorbent on the pollutant surface, allowing the sorbent to attract and bind the pollutant, magnetically collecting the saturated sorbent, compressing the sorbent to expel the sorbed pollutant, allowing the compressed sorbent to recover to a portion of its pre-compressed volume, and redistributing the sorbent on the pollutant surface for a subsequent collection and recovery cycle, pollutant spill may be expeditiously, inexpensively and efficiently removed from the surface of an aquatic medium.

While major pollutant spills, extending for miles on the open sea, are particularly suited for collection and recovery by the hereinbefore described recovery unit, small spills and spills immedately adjacent the shoreline may be more efficiently treated by the use of one or more small hand tools which are capable of attracting, holding and compressing the hydrocarbon-saturated sorbent.

Figures 6, 7:
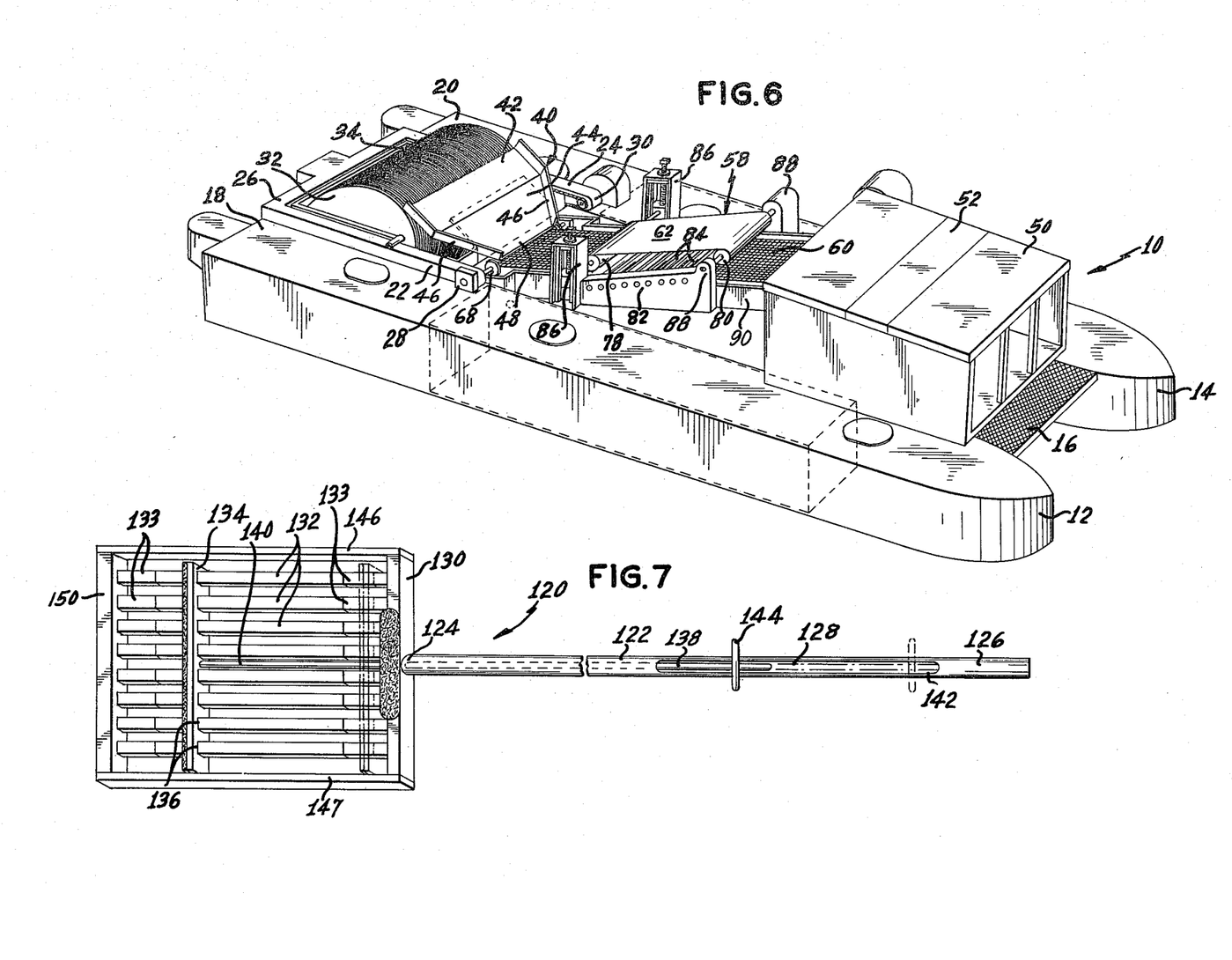
FIG. 6 is a perspective view of the recovery unit shown in FIG. 1.
FIG. 7 is a perspective view of a magnetic hand tool utilized for the collection of the sorbent particles constructed in accordance with an alternative embodiment of the invention.

Referring to FIG. 7, there is seen a magnetic rake indicated generally at 120. Magnetic rake 120 comprises an elongated handle 122 having a first end 124 and a second end 126 and having a central hollow 128 extending from a point adjacent second end 126 through first end 124. A support cross-member, such as bar 130 is rigidly mounted normal to first end 124 of handle 122. A plurality of elongated magnetic tynes 132 having non-magnetic ends 133 are rigidly mounted to support cross-member 130 in parallel spaced relation and extend therefrom in a direction generally parallel to handle 122. A reciprocable pressing member 134 having a plurality of tyne-accepting holes 136 spaced along its length is mounted to the tynes 132 such that pressing member 134 is reciprocable along substantially the entire length of magnetic tynes 132 between a first position adjacent the support cross-member and a second position remote therefrom and adjacent the outer ends of the tynes. Means for reciprocating, such as elongated shaft 138 having a length substantially equal to that of shaft 122, are slidably mounted to handle 122 interiorly of central hollow 128. Shaft 138 extends through an aligned opening in support cross-member 130 and is rigidly connected to pressing member 134 by shaft end 140. An elongated opening 142 is made in handle 122 communicating with central hollow 128 and having a length of not less than the length of magnetic tynes 132. Grip 144 is rigidly mounted to shaft 138 through elongated opening 142 such that shaft 138 may be reversibly slidably displaced in order to freely reciprocate pressing member 134 between the first and and second positions hereinabove mentioned.

In its preferred embodiment, magnetic rake 120 is equipped with parallel, non-magnetic sides 146 and 147 rigidly mounted to the ends of support cross-member, and a non-magnetic end-stop cross-member 150 rigidly mounted to and between sides 146 and 147 and rigidly connected to the outwardly extending ends of tynes 132 in order to increase the overall rigidity of the magnetic rake.

In use, the position of pressing member 134 is adjusted to either of its two extreme positions by the manipulation of grip 144 and shaft 138. The rake is then immersed in the aquatic medium having pollutant saturated magnetic sorbent particles on the surface thereof such that magnetic tynes 132 are brought into attracting and holding contact with the saturated sorbent particles. The rake is then removed from the aquatic medium and supported over any suitable pollutant receptacle. Pressure is applied to grip 144 slidably displacing shaft 138 along central hollow 128 thereby moving pressing member 134 from its initial position along tynes 132. As pressing member 134 moves, the saturated sorbent particles in its path are carried along the tynes by pressing member 134. As pressing member 134 approaches its alternative extreme position, the sorbent particles are subjected to an increasing compression force between the pressing member and either the support cross-member and the end-stop cross-member which force causes the pollutant carried by the sorbent particles to be expelled from the particles and collected in the receptacle. The resulting compressed sorbent particles, containing small residual levels of pollutant, are then released and stored for further use.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A surface going aquatic vessel for the distribution, collection, treatment and redistribution of resilient sorbent particles in the collection of a liquid pollutant dispersed on the surface of an aquatic medium, said vessel comprising the following components:
   a. a pollutant storage tank
   b. a rotatably mounted cylindrical drum with its axis of rotation substantially normal to the direction of travel of said vessel and positioned such that the lowermost portion of said drum is immersed in said aquatic medium;
   c. means for rotating said drum about its axis;
   d. a plurality of circular magnetic bands mounted on the cylindrical surface of said drum in parallel spaced relation to each other, each of said bands defining a plane substantially normal to said axis of said drum;
   e. means for wiping said cylindrical surface of said drum, comprising (1) a wiper blade extending along the length of said drum immediately adjacent the surfaces of said magnetic bands and positioned forward of the axis of said drum, and (2) a take-off chute extending forwardly and downwardly from said wiper blade;
   f. means for momentarily compressing resilient sorbent particles
   g. a storage and distribution hopper having a lowermost portion spaced above the aquatic medium, and an uppermost portion for receiving resilient sorbent particles and positioned forward of said compressing means, said lowermost portion including an elongated opening substantially parallel to said axis of said drum;
   h. particle discharge means mounted along the length of said elongated opening;
   i. conveying means communicating from a point beneath the forward end of said take-off chute through said compressing means to said uppermost portion of said distribution hopper;
   j. means for actuating said discharge means, said conveying means, and said compressing means;
   k. an elongated pollutant sump comprising a drain chute coextensive with and positioned beneath said conveying means and terminating in a drain sump;
   l. a pollutant conduit communicationg said drain sump with said pollulant storage tank; and
   m. means for propelling said vessel along the surface of said aquatic body.

2. The vessel as set forth in claim 1 in the style of a catamaran having as hulls two of said pollutant storage tanks, each elongated in shape and mounted in parallel spaced relation to each other defining an elongated channel of aquatic medium therebetween, and said cylindrical drum being positioned across said channel between said hulls on the aft portion of said vessel.

3. The vessel as set forth in claim 2 having
   a. a pivot bracket mounted on each of said storage tanks;
   b. an elongated yoke each side of which is pivotally mounted respectively to one of said pivot brackets, and on each side of which is rotatably mounted, the respective end of said cylindrical drum at a point intermediate the length of said side; and c. means for moving said yoke about said pivot brackets to adjust the depth of immersion of said cylindrical drum in said aquatic medium.

4. The vessel as set forth in claim 3 wherein said means for wiping is mounted on said yoke, and wherein said wiper blade is non-magnetically susceptible and is fashioned with a plurality of notches of the appropriate size and shape to accommodate said magnetic bands, said means for wiping extending forwardly and downwardly to said take-off chute.

5. The vessel as set forth in claim 3 wherein said conveying means and said compression means are fixedly attached to said yoke such that any adjustment of the depth of immersion of said drum automatically adjusts said conveying means and said compressing means a corresponding amount.

6. The vessel as set forth in claim 1 wherein each of said plurality of magnetic bands comprises a plurality of individual magnets and oriented such that the magnetic poles of each said magnet are adjacent the opposite pole of the adjacent magnet on the adjacent magnetic band.

7. The vessel as set forth in claim 6 additionally comprising a coating of a non-magnetically susceptible, corrosion resistant sealer bonded to the surface of said cylindrical drum and said magnetic bands, whereby corrosion of said drum and said band by said aquatic medium is inhibited.

8. The vessel as set forth in claim 1 additionally comprising a flexible lip on said take-off chute along the lowermost edge thereof flexibly contacting said conveying means.

9. The vessel as set forth in claim 1 wherein said conveying means comprises
   a. a continuous loop mesh belt;
   b. a forward mesh belt roller means
   c. a rearward mesh belt roller means
   d. two adjustable mesh belt spacers respectively extending between corresponding ends of said forward and said rearward mesh belt roller means; said continuous loop mesh belt being mounted on said forward roller means and said rearward roller means and stretched therebetween by said spacers to form a firm movable surface.

10. The vessel as set forth in claim 9 wherein said continuous loop mesh belt comprises
    a. a flexible outer mesh belt having a relatively small mesh size and
    b. an inner mesh belt coextensive with and supporting said outer mesh belt, having a mesh size larger than that of said outer mesh belt and having a high resistance to deformation, being in driving contact with said forward and said rearward mesh belt roller means.

11. The vessel as set forth in claim 9 wherein said means for momentarily compressing comprises
    a. a flexible continuous loop pressure belt of substantially fluid-impermeable material;
    b. a forward pressure belt roller means
    c. a rearward pressure belt roller means
    d. a plurality of idler rollers in parallel spaced relation to said forward and said rearward pressure belt roller means and being positioned therebetween;
    e. a take-up frame in which is mounted said rearward pressure belt roller means in a vertically adjustable mounting to and between said spacers and thereabove;
    f. a tension adjuster frame in which is mounted said forward pressure belt roller means in a vertically adjustable mounting; and
    g. means for rigidly rotatably mounting said idler rollers, said means being affixed to and vertically adjustable with said take-up frame and said tension adjuster frame; said pressure belt and being adjusted by said take-up frame with respect to the upper surface of said mesh belt so as to apply pressure thereto.

12. The vessel as set forth in claim 1 wherein said hopper comprises an enclosure having downwardly inclined walls terminating at the bottom in said elongated opening adjacent said discharge means.

13. A continuous method for the collection and recovery of liquid pollutant floating on the surface of an aquatic medium comprising the steps of:
    a. distributing buoyant, magnetically susceptible, oleophillic, resilient sorbent particles on the surface of said liquid pollutant;
    b. providing a sorbent-pollutant contact time sufficient for the sorbent to attract and sorb a portion of the liquid pollutant;
    c. magnetically collecting the pollutant-containing sorbent particles;
    d. passing said particles through a compression zone to expel the majority of said pollutant
    e. collecting said expelled pollutant
    f. allowing said compressed sorbent particles to expand to recover at least a portion of their original uncompressed volume;
    g. redistributing said sorbent particles on the surface of the remaining pollutant; and
    h. repeating the steps of providing, magnetically collecting, passing, collecting, allowing and redistributing for a number of cycles sufficient to to collect and recover said liquid pollutant.

14. The method of claim 13 which additionally comprises the steps of temporarily storing said expelled pollutant, and subsequently transferring said temporarily stored pollutant to a transportation vessel for transportation to a disposal site.

15. The method of claim 13 wherein the step of distributing comprises maintaining a supply of sorbent particles, continuously applying a layer of sorbent particles to the surface of said liquid pollutant, and the step of collecting said particles comprises continuously picking up sorbent particles after a period in contact with said pollutant.

16. The method of claim 13 wherein the step of magnetically collecting comprises partially immersing a magnetic barrier in the path of flow of said sorbent particles, continuously magnetically binding said pollutant-containing particles to said magnet barrier, moving said barrier with respect to said aquatic medium, removing said particles from said magnetic barrier, and transporting said sorbent particles to said compression zone.

17. The method of claim 13 wherein said compression zone comprises an endless perforate belt supporting said particles and an endless compression belt applying sufficient pressure to said particles to compress said particles and expel a substantial portion of pollutant therefrom.

18. The method of claim 13 wherein said compressed sorbent particles after expulsion of pollutant are maintained in temporary storage for a period of time sufficient to recover a substantial portion of their uncompressed volume before being redistributed on the surface of said liquid pollutant.

19. The method of claims 13,14,15,16,17 or 18 wherein said pollutant is a petroleum hydrocarbon, and said sorbent particles are polyurethane foam throughout which are dispersed iron particles having a size of about 100–1500 microns said sorbent particles having a volume of 1/12 to 8.0 cu. in. and a density of 5–20 lbs. per cu. ft.

* * * * *